Figures 1, 2, 3, 4:
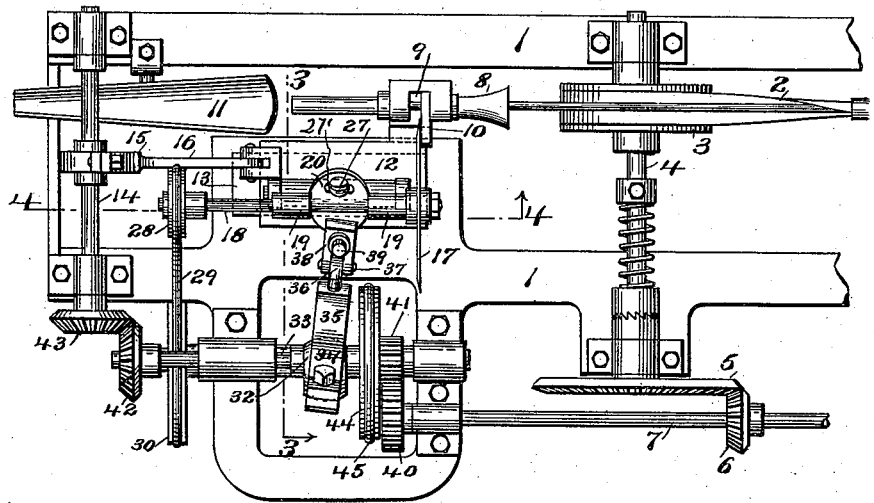

No. 687,162. Patented Nov. 19, 1901.
J. MAHONY.
CUTTING MECHANISM FOR CIGARETTE MACHINES.
(Application filed Apr. 5, 1901.)
(No Model.)

Attest:
Francis M. Phelps
William Bissing.

Inventor:
John Mahony
by Philipp, Sawyer, Rice & Kennedy
Attys

UNITED STATES PATENT OFFICE.

JOHN MAHONY, OF DURHAM, NORTH CAROLINA, ASSIGNOR TO THE AMERICAN TOBACCO COMPANY, OF NEW YORK, N. Y., A CORPORATION OF NEW JERSEY.

CUTTING MECHANISM FOR CIGARETTE-MACHINES.

SPECIFICATION forming part of Letters Patent No. 687,162, dated November 19, 1901.

Application filed April 5, 1901. Serial No. 54,479. (No model.)

*To all whom it may concern:*

Be it known that I, JOHN MAHONY, a citizen of the United States, residing at Durham, county of Durham, and State of North Carolina, have invented certain new and useful Improvements in Cutting Mechanism for Cigarette-Machines, fully described and represented in the following specification and the accompanying drawings, forming a part of the same.

This invention relates to certain improvements in cutting mechanism for moving material.

In machines for cutting moving material, and more particularly cigarettes, the material, such as the rod from which the cigarette is cut, moves so rapidly that it is necessary to give the cutter not only the movement toward and from the rod by which it effects the cut, but also a reciprocating movement in the direction in which the cigarette-rod moves. In Patent No. 561,964, granted June 16, 1894, to the American Tobacco Company as the assignee of Daniel J. Campbell, a mechanism for cutting cigarettes is shown in which the cutter is given the longitudinal reciprocating movement before referred to—that is, a movement in the direction of the movement of the cigarette-rod to be cut—and at the same time is given a movement toward and away from the cigarette-rod, this movement being the one by which the cutting is effected. In the mechanism shown in said patent the reciprocating movement referred to is effected by means of an eccentric and suitable connections. The movement by which the cutting is effected is, however, produced by a cam, said cam operating against a wear-plate on an arm extending from the frame or carriage in which the cutter is mounted, the arm being held with the wear-plate in contact with the cam by means of suitable springs. While this mechanism operates satisfactorily at comparatively low rates of speed, it has been found in practical operation that when the speed of the machine is increased the spring is not sufficiently quick to hold the arm in such a position that the wear-plate is continuously in contact with the cam. A jumping and uneven movement therefore results, which seriously interferes with the efficiency of the cutter. From a practical standpoint, therefore, it has been found that a mechanism in which the movement of the cutter toward and away from the moving cigarette-rod is produced by a cam and spring seriously limits the speed of the machine.

It is the object of this invention to produce a cutting mechanism in which the cutter has the movements above described, but in which the movement of the cutter by which the cut is effected is produced by an eccentric rather than by a cam, so that the movement is positive in both directions and the cutting mechanism can be run at any desired speed.

With this and other objects in view the invention consists in certain parts, improvements, and combinations, which will be hereinafter described, and then more fully pointed out in the claims hereunto appended.

Referring to the drawings, which form a part of this specification and in which like characters of reference indicate the same parts, Figure 1 is a plan view of a cutting mechanism constructed in accordance with the present invention. Fig. 2 is an end view of the construction shown in Fig. 1. Fig. 3 is a sectional elevation taken on the line 3 3 of Fig. 1 and looking in the direction of the arrow in said figure. Fig. 4 is a sectional elevation on the line 4 4 of Fig 1 and looking in the direction of the arrow in said figure.

Referring to the drawings, which illustrate one embodiment of the invention, 1 indicates a portion of the frame of a cigarette-machine, this machine being of the well-known Bonsack type.

The belt by which the cigarette-rod is formed is indicated at 2, said belt passing around a drum 3, mounted on a shaft 4, which is supported in suitable bearings in the frame. This shaft 4 is driven by a gear 5, said gear meshing with another gear 6, mounted on a way-shaft 7. After leaving the belt the rod passes through a suitable guide 8, said guide having a recess 9, in which the cutter works, said recess being provided with a steel wearing-face 10, which coöperates with the cutter. The cut cigarette is delivered into a chute 11. The parts so far described are old and well known in the art, but are shown for the purpose of illustrating the invention. It is to be understood, however, that any other cigarette forming and guiding mechanism may be substituted therefor.

In order that the cutter may be given a longitudinal reciprocating movement—that is, a movement in the direction in which the cigarette-rod moves—there is provided a slide 12, which is shown as engaging a dovetailed way 13, secured to the frame of the machine by screws or in any other suitable manner. This slide serves to support the guide 8, before described, so that the guide moves with the slide.

Any suitable means may be employed for reciprocating the slide 12. Preferably, however, and as shown the slide will be reciprocated by means of an eccentric mounted on a shaft 14, suitably journaled in the frame, said eccentric being surrounded by a strap 15, said strap having a bar 16 extending therefrom which is pivotally connected, as shown, to the slide.

The cutter employed may be of any suitable description and may be mounted in any desired manner on the slide. Preferably, however, and as shown the cutter will be a rotating cutter, such a cutter being indicated at 17. The cutter 17 is mounted on a shaft 18, said shaft being supported in a suitable rocking frame. As shown, the shaft passes through journals 19, which are connected to, preferably by being integrally formed therewith, a disk 20. This disk 20 has a rib 21 on its under side, said rib engaging a similar groove in a similar disk 22, which is supported on arms 23, said arms being formed to provide bearings 24. A pivot-rod 25 passes through said bearings and through the ears 26, rising from the slide 12. The disks 20 and 22 are connected by means of a screw 27, which passes through a slot 27' in the disk 20, or in any other suitable manner, the purpose of the construction being to permit the cutter 17 to be arranged at a suitable angle with relation to the wear-plate 10, with which it coöperates.

The cutter may be driven in any desired manner. As shown, the shaft 18 is provided with a pulley 28, around which passes a driving-belt 29, said belt also passing around a pulley 30, which is mounted on the shaft 31, journaled in suitable bearings on the side of the machine-frame.

The rocking movement of the frame in which the cutter 17 is mounted is produced by an eccentric, so that the movement of the frame is positive in both directions—that is, toward and away from the moving cigarette-rod. The means by which the eccentric produces the movement of the frame may be varied within wide limits. They must, however, be of such a character as to permit the longitudinal movement of the frame before described. In the construction shown, which is a preferred form, the rocking movement of the frame is produced by means of an eccentric 32, mounted on a shaft 33, suitably journaled in bearings rising from the frame. This eccentric is preferably curved in the direction of its axis of rotation, the curve being preferably of such a character as to make the operating-face of the eccentric convex. When the eccentric is constructed as shown—that is, with a convex-curved face—the engaging face of the eccentric-strap 34 will be similarly curved—that is, it will be concave. The means by which the eccentric produces the movement of the rocking frame may be varied within wide limits. Preferably, however, a bar 35, which is shown as integral with one part of the eccentric-strap, is provided. This bar has connected to it a stem 36, which is preferably threaded into it so as to be adjustable with respect to it, said stem being secured by a pivot 37 to a block 38, which is pivotally mounted on a stud 39 rising from the disks 20 and 22, before described, said stud passing through a slot (not shown) in the upper disk 20, this slot being similar to the one through which the screw 27 passes. By this construction as the eccentric rotates it will be seen that the cutter is given a movement toward and away from the moving rod to cut the same, and at the same time the longitudinal movement of the slide 12 is permitted, the eccentric-strap working on the eccentric in a manner similar to that of a ball-and-socket joint.

The shaft 33 may be driven in any suitable manner. As shown, it is driven by means of a gear 40, mounted on the way-shaft 7, before referred to, said gear engaging with a gear 41 on the shaft 33. This shaft 33 is also preferably provided with a miter-gear 42, said gear meshing with a similar gear 43 on the shaft 14 in order to drive the same. The shaft 33 is also preferably provided with a pulley 44, around which passes a belt 45, said belt passing around a pulley mounted on the shaft 31 and serving to drive the same.

The operation of the construction will be clear from the description heretofore given, and a detailed statement thereof is unnecessary.

While the mechanism which has been heretofore described illustrates the preferred form of the invention, it is to be understood that the invention is not to be confined to the specific details thereof, as such details may be widely varied, the essential idea of the invention being to produce a cutting mechanism in which the cutter may be given a longitudinal movement by any suitable means and a rocking movement by means of an eccentric, the connections between the eccentric and the cutter being such as to permit the longitudinal movement.

What is claimed is—

1. In a mechanism for cutting moving material, the combination with the cutter of means for giving it a longitudinal movement, an eccentric and suitable connections including the eccentric-strap for giving the cutter a movement at an angle to the longitudinal movement, said connections being constructed to permit said longitudinal movement, substantially as described.

2. In a mechanism for cutting moving material, the combination with the cutter of means for giving it a longitudinal movement, an eccentric having its face curved in the direction of its axis of rotation, an eccentric-strap having a curved face which corresponds with the face of the eccentric and connections between the strap and the cutter whereby the eccentric gives the cutter a movement at an angle to its longitudinal movement and said longitudinal movement is permitted.

3. In a mechanism for cutting moving material, the combination with the cutter of means for giving it a longitudinal movement, an eccentric having its operating-face convexed in the direction of its axis of rotation, an eccentric-strap having its engaging face concaved, and connections between the strap and cutter whereby the eccentric gives the cutter a movement at an angle to its longitudinal movement and said longitudinal movement is permitted, substantially as described.

4. The combination with means for supporting and advancing a rod of moving material, of a frame, a cutter mounted in said frame, an eccentric and suitable connections for giving the frame a movement in the direction of movement of the material, an eccentric and suitable connections for giving the frame a movement toward and away from the moving material, said connections being constructed to permit the movement of the frame in the direction of the material, substantially as described.

5. In a cutting mechanism, the combination with a frame, of a rotating cutter mounted therein, means for giving the frame a longitudinal movement, a shaft, an eccentric on said shaft, said eccentric having its operating-face curved in the direction of the axis of the shaft, an eccentric-strap having its engaging face similarly curved, and connections between the eccentric-strap and the frame, substantially as described.

6. In a cutting mechanism, the combination with a slide, of a frame pivotally mounted thereon, a cutter-shaft journaled in the frame, a cutter on said shaft, means for rotating the shaft, a shaft carrying an eccentric which has its operating-face convexed in the direction of the axis of the shaft, an eccentric-strap having its face concaved to fit said eccentric, and a pivotal connection between said eccentric-strap and the cutter-frame, substantially as described.

7. In a mechanism for cutting moving material, the combination with a cutter, of means for giving it a longitudinal movement, an eccentric having its operating-face convexed in the direction of its axis of rotation, an eccentric-strap having its face concaved, a bar extending from said strap, an adjustable stem connected with the bar, a rocking frame in which the cutter is mounted, and a pivotal connection between the stem and the rocking frame, substantially as described.

In testimony whereof I have hereunto set my hand in the presence of two subscribing witnesses.

JOHN MAHONY.

Witnesses:
W. W. CHEEK,
C. N. TASSET.